United States Patent
Ruuswik

(10) Patent No.: US 7,498,871 B2
(45) Date of Patent: Mar. 3, 2009

(54) SPECTRUM SPREADERS INCLUDING TUNABLE FILTERS AND RELATED DEVICES AND METHODS

(75) Inventor: Anders Ruuswik, Vellinge (SE)

(73) Assignee: Sony Ericsson Mobile Communications AB, Lund (SE)

(*) Notice: Subject to any disclaimer, the term of this patent is extended or adjusted under 35 U.S.C. 154(b) by 163 days.

(21) Appl. No.: 11/544,121

(22) Filed: Oct. 6, 2006

(65) Prior Publication Data
US 2007/0257718 A1    Nov. 8, 2007

Related U.S. Application Data

(60) Provisional application No. 60/793,335, filed on Apr. 19, 2006.

(51) Int. Cl.
*H03B 1/00* (2006.01)
(52) U.S. Cl. .......................... 327/551; 327/557
(58) Field of Classification Search .................. None
See application file for complete search history.

(56) References Cited

U.S. PATENT DOCUMENTS

| | | | |
|---|---|---|---|
| 5,263,055 A | 11/1993 | Cahill | |
| 5,745,848 A | 4/1998 | Robin | |
| 6,169,889 B1 | 1/2001 | Servilio et al. | |
| 6,272,121 B1 * | 8/2001 | Smith et al. | 370/342 |
| 6,501,307 B1 | 12/2002 | Yen | |
| 6,879,817 B1 * | 4/2005 | Rawlins et al. | 455/296 |
| 7,010,621 B2 * | 3/2006 | Calkins et al. | 709/250 |
| 7,050,762 B2 * | 5/2006 | Boldt et al. | 455/73 |
| 2002/0131541 A1 | 9/2002 | Soe et al. | |
| 2002/0142724 A1 | 10/2002 | Nakamo | |
| 2003/0043291 A1 | 3/2003 | Ishii | |
| 2003/0160641 A1 | 8/2003 | Starr et al. | |
| 2004/0116168 A1 | 6/2004 | Usui | |
| 2004/0257124 A1 | 12/2004 | Araki et al. | |
| 2005/0030114 A1 | 2/2005 | Starr et al. | |
| 2005/0122145 A1 * | 6/2005 | Ido et al. | 327/156 |
| 2005/0180490 A1 | 8/2005 | Hattori | |

(Continued)

FOREIGN PATENT DOCUMENTS

EP    0 416 423 A2    3/1991

(Continued)

OTHER PUBLICATIONS

International Search Report and Written Opinion for PCT/EP2006/067440; date of mailing Jan. 25, 2007.

(Continued)

*Primary Examiner*—Cassandra Cox
(74) *Attorney, Agent, or Firm*—Myers Bigel Sibley & Sajovec

(57) ABSTRACT

A spectrum spreader may include a signal conductor and a tunable filter. The signal conductor may be configured to receive a clock signal having a clock signal frequency. The tunable filter may be coupled to the signal conductor wherein the tunable filter is configured to spread a frequency of the clock signal responsive to a control signal to provide a spread spectrum clock signal. More particularly, a frequency of the spread spectrum clock signal may be spread relative to the clock frequency. Related communications devices and methods are also discussed.

21 Claims, 2 Drawing Sheets

U.S. PATENT DOCUMENTS

2005/0255881 A1  11/2005  Yamamoto et al.

FOREIGN PATENT DOCUMENTS

| EP | 0 655 829 | A1 | 5/1995 |
| EP | 0 803 997 | A2 | 10/1997 |
| GB | 2 350 988 | A | 12/2000 |
| JP | 07 303079 | A | 11/1995 |

OTHER PUBLICATIONS

STMicroelectronics Debuts Megapixel Camera Chipset for Mobile Devices; http://www.st.com/stonline/press/news/year2004/p1540p.htm pp. 1-2.

Alliance Semiconductor Low Power Peak EMI Reducing Solution; ASM3P2872A, Aug. 2004 rev. 2.03 pp. 1-9.

\* cited by examiner

SPECTRUM SPREADERS INCLUDING TUNABLE FILTERS AND RELATED DEVICES AND METHODS

RELATED APPLICATION

The present application claims the benefit of priority from U.S. Provisional Application No. 60/793,335 filed Apr. 19, 2006, the disclosure of which is hereby incorporated herein in its entirety by reference.

FIELD OF THE INVENTION

The present invention relates to the field of electronics, and more particularly to spectrum spreaders for clock signals and related methods and devices.

BACKGROUND

In a radiotelephone, a reference crystal may be used to generate a clock signal for a processor of the radiotelephone. Harmonics of the clock signal, however, may interfere with the radio signals received at the radiotelephone. With a 13 MHz clock signal, for example, the $72^{nd}$ and $73^{rd}$ harmonics of the 13 MHz clock signal may interfere with communications provided over one or more channels of the GSM (Global System For Mobile Telecommunications) 900 MHz standard. For example, the $72^{nd}$ harmonic at 936 MHz may interfere with GSM channel 5, and/or the $73^{rd}$ harmonic may interfere with GSM channel 70. Because inputs/outputs to/from the radiotelephone processor are provided between the processor and other elements (e.g., a keypad, a display, a speaker, a microphone, etc.) of the radiotelephone, it may be difficult to provide adequate shielding with respect to the clock signal and/or harmonics thereof.

SUMMARY

According to some embodiments of the present invention, a communications device may include a clock signal generator configured to generate a clock signal having a clock frequency, and a receiver configured to receive communications over an air interface. A spectrum spreader may be coupled to the clock signal generator, and the spectrum spreader may be configured to generate a spread spectrum clock signal responsive to the clock signal wherein a frequency of the spread spectrum clock signal is spread relative to the clock frequency. In addition, a processor may be coupled to the receiver and to the spectrum spreader, and the processor may be configured to operate at the frequency of the spread spectrum clock signal and to process the communications received at the receiver. Moreover, the frequency of the spread spectrum clock signal may be spread above and below the clock frequency.

The spectrum spreader may include a signal conductor configured to receive a clock signal having a clock signal frequency, and a tunable filter coupled to the signal conductor. The tunable filter may be configured to spread a frequency of the clock signal responsive to a control signal to provide the spread spectrum clock signal. The tunable filter may include an inductor-capacitor (LC) band pass filter, for example, having an inductive circuit and a capacitive circuit coupled in parallel between the signal conductor and a reference voltage. In addition, the capacitive circuit may include a capacitor and a varactor diode coupled in series between the signal conductor and the reference voltage, and a control signal generator may be coupled to a control node between the capacitor and the varactor diode of the tunable filter such that the control signal generator is configured to generate the control signal that is applied to the control node. A resistor may also be coupled between the control signal generator and the control node.

More particularly, the control signal generator may be configured to generate the control signal having a control signal frequency such that the clock signal frequency is on the order of at least 10 times greater than the control signal frequency. The control signal generator, for example, may be configured to generate the control signal having a frequency in the range of about 1 kHz to about 200 kHz, and the clock signal frequency may be in the range of about 1 MHz to about 100 MHz. The control signal generator may be further configured to generate the control signal as a square wave, a triangular waver, and/or a sinusoidal wave, and/or to generate the control signal having a peak-to-peak amplitude of about 3 volts. In addition, the receiver may be coupled to the clock signal generator, and the receiver may be configured to receive communications over the air interface using the clock signal.

According to some other embodiments of the present invention, a spectrum spreader may include a signal conductor configured to receive a clock signal having a clock signal frequency, and a tunable filter coupled to the signal conductor. The tunable filter may be configured to spread a frequency of the clock signal responsive to a control signal to provide a spread spectrum clock signal wherein a frequency of the spread spectrum clock signal is spread relative to the clock frequency. More particularly, the frequency of the spread spectrum clock signal may be spread above and below the clock frequency.

The tunable filter may include an inductor-capacitor (LC) band pass filter having an inductive circuit and a capacitive circuit coupled in parallel between the signal conductor and a reference voltage. The capacitive circuit may include a capacitor and a varactor diode coupled in series between the signal conductor and the reference voltage, and a control signal generator may be coupled to a control node between the capacitor and the varactor diode of the tunable filter with the control signal generator being configured to generate the control signal that is applied to the control node. In addition, a resistor may be coupled between the control signal generator and the control node.

The control signal generator may be further configured to generate the control signal having a control signal frequency such that the clock signal frequency is on the order of at least 10 times greater than the control signal frequency. For example, the control signal generator may be configured to generate the control signal having a frequency in the range of about 1 kHz to about 200 kHz, and the clock signal frequency may be in the range of about 1 MHz to about 100 MHz. Moreover, the control signal generator may be configured generate the control signal as a square wave, a triangular waver, and/or a sinusoidal wave, and/or having a peak-to-peak amplitude of about 3 volts.

According to still other embodiments of the present invention, a method of operating an electronic device may include receiving a clock signal having a clock signal frequency, and spreading a frequency of the clock signal responsive to a control signal to provide a spread spectrum clock signal. A frequency of the spread spectrum clock signal may be spread relative to the clock frequency. Moreover, the frequency of the spread spectrum clock signal may be spread above and below the clock frequency.

Receiving the clock signal may include receiving the clock signal on a signal conductor, and spreading the frequency of the clock signal may include filtering the clock signal using an inductor-capacitor (LC) band pass filter coupled to the signal conductor. More particularly, the inductor-capacitor (LC) band-pass filter may include an inductive circuit and a capacitive circuit coupled in parallel between the signal conductor and a reference voltage. In addition, the capacitive circuit may include a capacitor and a varactor diode coupled in series between the signal conductor and the reference voltage, and the control signal may be applied to a control node between the capacitor and the varactor diode.

The clock signal frequency may be on the order of at least 10 times greater than a frequency of the control signal. For example, the control signal generator may be configured to generate the control signal having a frequency in the range of about 1 kHz to about 200 kHz, and the clock signal frequency may be in the range of about 1 MHz to about 100 MHz. Moreover, the control signal may be a square wave, a triangular waver, and/or a sinusoidal wave, and/or the control signal may have a peak-to-peak amplitude of about 3 volts.

In addition, communications may be received over an air interface, and the communications received over the air interface may be processed using the spread spectrum clock signal. Moreover, the communications may be received over the air interface using the clock signal without spreading.

DETAILED DESCRIPTION

Figure 1:
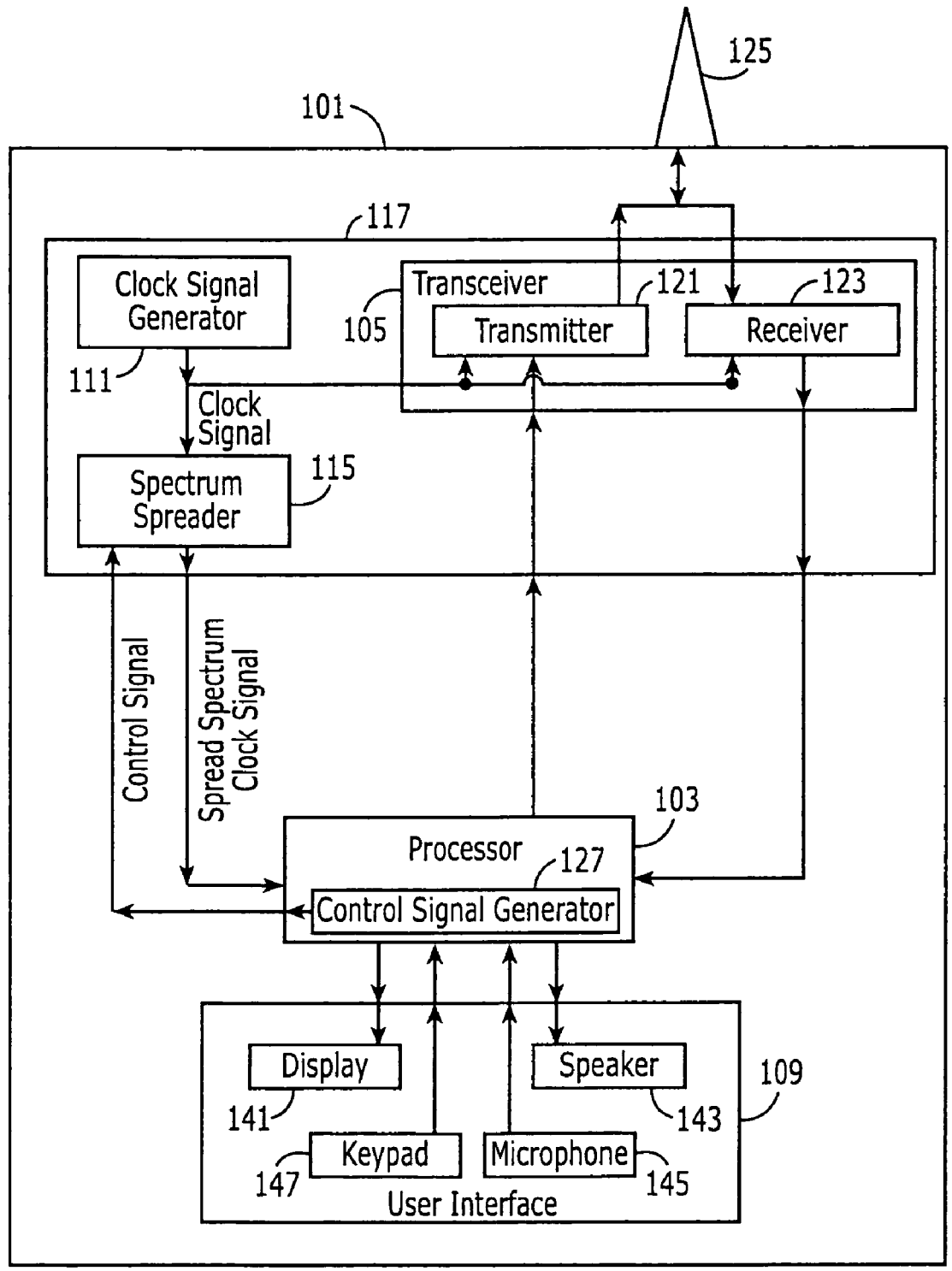
FIG. 1 is a block diagram of communications devices according to embodiments of the present invention.

Specific exemplary embodiments of the invention now will be described with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawing, like numbers refer to like elements. It will be understood that when an element is referred to as being "connected" or "coupled" to another element, it can be directly connected or coupled to the other element or intervening elements may be present. Furthermore, "connected" or "coupled" as used herein may include wirelessly connected or coupled.

The terminology used herein is for the purpose of describing particular embodiments only and is not intended to be limiting of the invention. As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It will be understood that although the terms first and second are used herein to describe various elements, these elements should not be limited by these terms. These terms are only used to distinguish one element from another element. Thus, a first frequency below could be termed a second frequency, and similarly, a second frequency may be termed a first frequency without departing from the teachings of the present invention. As used herein, the term "and/or" includes any and all combinations of one or more of the associated listed items. The symbol "/" is also used as a shorthand notation for "and/or".

Various embodiments of the present invention are described below with reference to block diagrams illustrating methods, apparatus and computer program products according to various embodiments of the invention. It will be understood that each block of the block diagrams and/or operational illustrations, and combinations of blocks in the block diagrams and/or operational illustrations, can be implemented by analog and/or digital hardware, and/or computer program instructions. These computer program instructions may be provided to a processor of a general purpose computer, special purpose computer, ASIC, and/or other programmable data processing apparatus, such that the instructions, which execute via the processor of the computer and/or other programmable data processing apparatus, create means for implementing the functions/acts specified in the block diagrams and/or operational illustrations. Accordingly, it will be appreciated that the block diagrams and operational illustrations support apparatus, methods and computer program products.

Communications devices according to embodiments of the present invention are illustrated in FIG. 1. As shown in FIG. 1, a communications device 101 (such as a radiotelephone) may include a processor 103 (such as a central processing unit or CPU), a transceiver 105, a user interface 109, a fixed frequency clock signal generator 111 (such as an oscillator), and a spectrum spreader 115. The transceiver 105 may include a transmitter 121 and a receiver 123 coupled to an antenna 125. The user interface 109 may include a display 141, a speaker 143, a microphone 145, and a keypad 147. Moreover, the transceiver 105, the oscillator 111, and the spectrum spreader 115 may be provided in electromagnetic interference (EMI) shielding 117.

Accordingly, the processor 103 and the transceiver 105 may operate to transmit and/or receive radio communications over an air interface using a system clock signal generated by the fixed frequency clock signal generator 111. The system clock signal, for example, may be a sinusoidal wave having a frequency of about 13 MHz and a peak-to-peak amplitude of about 400 mV, but other frequencies, amplitudes, and/or wave shapes may be used. For example, the system clock signal may have a frequency of about 26 MHz.

More particularly, the transmitter 121 may be configured to transmit communications generated by the processor 103 using one of a plurality of uplink frequency channels of an air interface, and the receiver 123 may be configured to receive communications using one of a plurality of downlink frequency channels of the air interface. By way of example, the GSM 900 MHz air interface standard may provide a plurality of 200 kHz wide uplink frequency channels (for transmissions from a mobile terminal to a base station) over an uplink frequency band in the range of about 933 MHz to about 960 MHz and a plurality of 200 kHz wide downlink frequency channels (for transmissions from a base station to a mobile terminal) over an downlink frequency band in the range of about 890 MHz to about 915 MHz. In alternatives, the transceiver 105 may be configured to operate using other air interface standards such as the PCS (Personal Communications Services) standard and/or DCS (Digital Cellular System) standard, and/or using other frequency bands such as frequency bands at about 900 MHz, 1800 MHz, and/or 1900 MHz.

The clock signal generator 111 may thus generate a clock signal having a fixed clock frequency, and the transmitter 105 and the receiver 123 of the transceiver 121 may operating using the clock signal having the fixed frequency of, for example, 13 MHz. Harmonic components of the clock signal may interfere with frequencies used for communications channels received using receiver 123, and the EMI shielding 117 may reduce this potential interference. Proper operation of the transmitter 121 and/or the receiver 123 may require that the clock signal received from the clock signal generator 111 at the transceiver 105 have a relatively fixed frequency.

Operations of the processor 103, however, may not require as precise a clock frequency as may be required by the transceiver 105. Accordingly, the processor 103 may run using the spread spectrum clock signal that is derived from the clock signal using the spectrum spreader 115. More particularly, the spectrum spreader 115 may be configured to generate a spread spectrum clock signal responsive to the clock signal from the clock signal generator 111 wherein a frequency of the spread spectrum clock signal is spread relative to the clock frequency. More particularly, the frequency of the spread spectrum clock signal may be spread above and below the clock frequency. By spreading the frequency of the clock signal provided to the processor 103, harmonic components of the spread spectrum clock signal may be spread over different frequencies so that an aggregate of interference at particular channel frequencies may be reduced. Accordingly, EMI shielding for the processor 103 and/or other components (such as the user interface 109) in communication with the processor 103 may be reduced and/or eliminated.

Accordingly, the communications device 101 may include the clock signal generator 111 configured to generate the clock signal having the clock frequency, and the receiver 123 coupled to the clock signal generator. Accordingly, the receiver 123 may be configured to receive communications over an air interface using the clock signal. The spectrum spreader 115 is also coupled to the clock signal generator 111, and the spectrum spreader 115 may be configured to generate a spread spectrum clock signal responsive to the clock signal wherein a frequency of the spread spectrum clock signal is spread relative to the clock frequency. More particularly, the processor 103 may be coupled to the receiver 123 and to the spectrum spreader 115, and the processor 103 may be configured to operate at the frequency of the spread spectrum clock signal and to process the communications received at the receiver.

According to some embodiments of the present invention, the spectrum spreader 115 may include a signal conductor and a tunable filter coupled to the signal conductor. The signal conductor may be configured to receive a clock signal having a clock signal frequency, and the tunable filter may be configured to spread a frequency of the clock signal responsive to a control signal to provide a spread spectrum clock signal. More particularly, the tunable filter may be an inductor-capacitor (LC) band pass filter having an inductive circuit and a capacitive circuit coupled in parallel between the signal conductor and a reference voltage. Moreover, the capacitive circuit may include a capacitor and a varactor diode coupled in series between the signal conductor and the reference voltage.

As further shown in FIG. 1, the control signal may be generated by a control signal generator 127, and the control signal may be applied to a control node between the capacitor and the varactor diode of the tunable filter includedof the spectrum spreader 115. While the control signal generator 127 is shown in FIG. 1 as an element of the processor 103, the control signal generator 127 may be implemented in whole or in part outside the processor 103. The control signal generator 127 may be configured to generate the control signal such that the clock signal frequency is on the order of at least 10 times greater than a frequency of the control signal. More particularly, a frequency of the control signal may be in the range of about 1 kHz to about 200 kHz, and the clock signal frequency may be in the range of about 1 MHz to about 100 MHz. Moreover, the control signal generator 127 may generate the control signal as a square wave, a triangular waver, and/or a sinusoidal wave, and/or the control signal may have a peak-to-peak amplitude of about 3 volts. For example, the control signal may oscillate between about 0 Volts and about 2.9 Volts. While particular frequencies, wave shapes, and amplitudes of the control signal have been discussed by way of example, the control signal may be provided using other frequencies, wave shapes, and/or amplitudes according to embodiments of the present invention. In addition, a resistor may be coupled between the control signal generator 127 and the control node of the tunable filter.

The spectrum spreader 115 may thus generate the spread spectrum clock signal responsive to the clock signal generated by the clock signal generator 111 and responsive to the control signal generated by the control signal generator 127. By way of example, the clock signal (generated by the clock signal generator 111) may have a frequency of about 13 MHz, and the control signal (generated by the control signal generator 127) may have a frequency in the range of about 1 kHz to about 200 kHz, more particularly, in the range of about 30 kHz to about 100 kHz, and still more particularly, in the range of about 90 kHz to about 100 kHz. According to other embodiments of the present invention, the clock signal may have a frequency of about 26 MHz, and the control signal may have a frequency in the range of about 1 kHz to about 200 kHz.

More particularly, the control signal generator 127 may be configured to adapt one or more characteristics of the control signal, for example, to accommodate changes in operating conditions. A feed-back loop from the receiver 123 to the processor 103 and/or the control signal generator 127 may allow a determination of interference with communications received through the receiver 123, and the control signal generator 127 may be configured to adapt one or more characteristics of the control signal responsive to changes in levels of interference at the receiver 123. According to some embodiments of the present invention, the control signal generator 127 may generate the control signal having a first non-zero frequency during a first period of time and a second non-zero frequency during a second period of time, wherein the first and second frequencies are different. Moreover, during a third period of time, the control signal generator may be configured to generate a control signal having a frequency of zero, so that the phase of the clock signal is not shifted and the spectrum of the clock is not spread during the third period of time.

According to some other embodiments of the present invention, the control signal generator 127 may be configured to generate the control signal having a first wave shape (such as one of a square wave, a sinusoidal wave, and a triangular wave) during a first period of time, and having another wave shape (such as another of a square wave, a sinusoidal wave, and a triangular wave) during a second period of time, wherein the first and second wave shapes are different. According to still other embodiments of the present invention, the control signal generator 127 may be configured to generate the control signal having a first non-zero amplitude during a first period of time and having a second non-zero amplitude during a second period of time, wherein the first and second non-zero amplitudes are different.

As shown in FIG. 1, the clock signal from the clock signal generator 111 may be provided to both the transceiver 105 and to the spectrum spreader 115 (used to provide the spread spectrum clock signal for the processor 103). Accordingly, one clock signal generator 111 (such as one oscillator) may be used to reduce cost and/or space. In an alternative, separate clock signal generators (such as separate oscillators) may be used to provide separate clock signals to the spectrum spreader 115 and to the transceiver 105.

While not shown in FIG. 1, an impedance (such as a resistance or resistor) may be provided to isolate the spectrum spreader 115 from the clock signal generator 111 and/or from the transceiver 105. For example, an impedance (such as a resistor) may be provided in the spectrum spreader 115 and/or along the signal line between the clock signal generator 111 and the spectrum spreader 115 (after split to the transceiver 105), and/or the signal line between the clock signal generator 111 and the spectrum spreader 115 may provide sufficient impedance without requiring a separate impedance element. If a separate clock signal generator is provided for the transceiver 105 so that the clock signal generator 111 is not coupled to the transceiver 105, an impedance (such as a resistor) may be provided in the clock signal generator 111, in the spectrum spreader 115, and/or along the signal line anywhere between the clock signal generator 111 and the spectrum spreader 115, and/or the signal line between the clock signal generator 111 and the spectrum spreader 115 and/or an output impedance of the clock signal generator 111 may provide sufficient impedance without requiring a separate impedance element.

Figure 2:
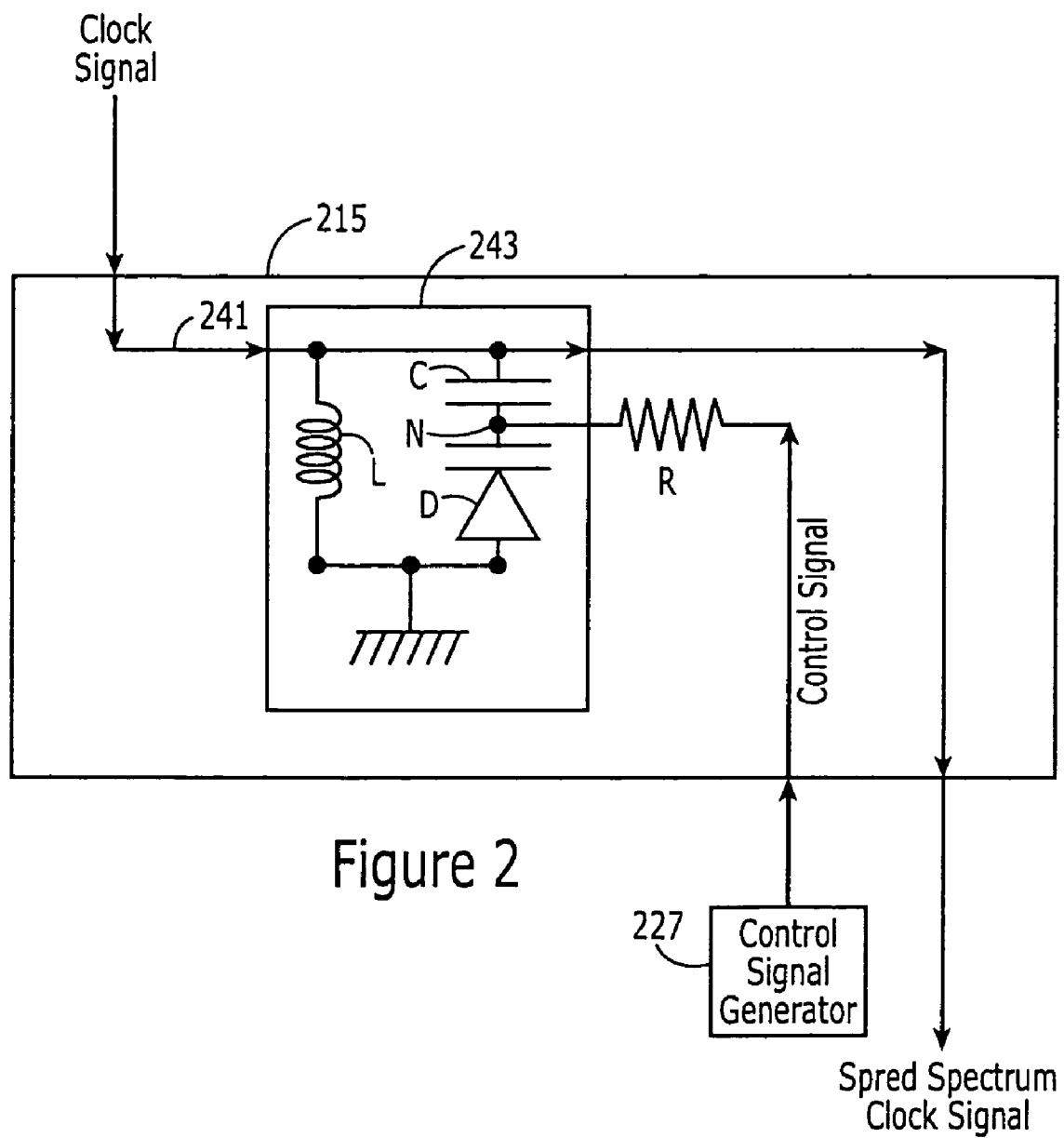
FIG. 2 is a schematic diagram of spectrum spreaders according to embodiments of the present invention.

A spectrum spreader 215 according to particular embodiments of the present invention is shown in FIG. 2. More particularly, the spectrum spreader 215 may include a signal conductor 241 configured to receive a clock signal having a clock signal frequency, and a tunable filter 243 coupled to the signal conductor 241. The tunable filter 243 may be configured to spread a frequency of the clock signal responsive to a control signal generated by the control signal generator 227 to provide a spread spectrum clock signal wherein a frequency of the spread spectrum clock signal is spread relative to the clock frequency. More particularly, the frequency of the spread spectrum clock signal may be spread above and below the clock frequency.

As shown in FIG. 2, the tunable filter 243 may be an inductor-capacitor (LC) band pass filter including an inductive circuit and a capacitive circuit coupled in parallel between the signal conductor and a reference voltage (such as a ground voltage). The inductive circuit may include inductor L, and the capacitive circuit may include a capacitor C and a varactor diode D coupled in series between the signal conductor 241 and the reference voltage (such as ground). Moreover, the control signal generator 227 may be coupled to a control node N between the capacitor C and the varactor diode D of the tunable filter 243 wherein the control signal generator 227 is configured to generate the control signal that is applied to the control node N. In addition, an impedance (such as a resistor R) may be coupled in series between the control signal generator 227 and the control node N.

The control signal generator 227 may be configured to generate the control signal having a control signal frequency such that the clock signal frequency is on the order of at least 10 times greater than the control signal frequency. For example, the control signal may have a frequency in the range of about 1 kHz to about 200 kHz and the clock signal may have a frequency in the range of about 1 MHz to about 100 MHz. More particularly, the clock signal may have a frequency of about 13 MHz, and the control signal may have a frequency in the range of about 30 kHz to about 100 kHz, and more particularly, in the range of about 90 kHz to about 100 kHz. Moreover, the control signal generator 227 may be configured to generate the control signal as a square wave, a triangular wave, and/or a sinusoidal wave, and/or having a peak-to-peak amplitude of about 3 volts. As discussed above, the clock signal and/or the control signal may be provided with other frequencies and/or wave shapes. For example, the clock signal may have a frequency of about 26 MHz and the control signal may have a frequency in the range of about 1 kHz to about 200 kHz.

The components of the tunable filter 215 may thus be provided so that the tunable filter 215 provides a band pass filter characteristic with a resonance of the filter (or center frequency of the pass band) being about the same as the frequency of the clock signal. By providing the control signal at the control node N between the capacitor C and the varactor diode D, an effective capacitance provided by the combination of the capacitor C and the varactor diode D may vary with the control signal. In other words, an effective capacitance of the varactor diode D may be varied by varying a back voltage of the varactor diode D using the control signal. Accordingly, a resonance of the tunable filter 243 may be varied with the control signal so that a phase of the spread spectrum clock signal alternatingly leads and lags a phase of the clock signal responsive to the control signal. For example, the phase of the spread spectrum clock signal may alternatingly lead and lag the phase of the clock signal by about +/−5 degrees or less. A frequency of the spread spectrum clock signal may thus vary above and below a frequency of the clock signal as the phase of the spread spectrum clock signal varies between leading and lagging the phase of the clock signal. Harmonics of the spread spectrum clock signal may be similarly spread so that interference at particular communications channels may be reduced.

The spectrum spreader 243 may also provide resiliency in the event of failure. If the control signal generator 227 and/or the tunable filter malfunction, for example, a frequency of the spread spectrum clock signal may no longer vary relative to that of the clock signal and harmonics of the spread spectrum clock signal may be concentrated at particular communications channels. A communications device incorporating the spectrum spreader 215 of FIG. 2 may thus continue operations, for example, without using the communications channel(s) most effected by the harmonics of the spread spectrum clock signal, or the affected channels may be used with decreased sensitivity.

According to some embodiments of the present invention, the spectrum spreader 115 of FIG. 1 may be implemented as the spectrum spreader 215 of FIG. 2 with the control signal generator 127 of FIG. 1 being implemented as the control signal generator 227 of FIG. 2. Accordingly, the clock signal of FIG. 2 may be provided by the clock signal generator 111 of FIG. 1, the control signal generator 227 of FIG. 2 may be implemented within the processor 103 of FIG. 1, and the spread spectrum clock signal of FIG. 2 may be provided to the processor 103 of FIG. 1. While the control signal generator 227 is discussed above as being implemented in a processor of a communications device, the control signal generator 227 (and/or portions thereof) may be implemented as a portion of the spectrum spreader 215, and/or outside the spectrum spreader and processor.

In addition, an impedance (such as a resistance or resistor) may be provided to isolate the spectrum spreader 215 from the clock signal and/or from a transceiver also coupled to the clock signal. For example, an impedance (such as a resistor) may be provided between the clock signal and the tunable filter 243, for example, along the signal conductor 241 in the spectrum spreader 115 and/or along the signal line between the clock signal and the spectrum spreader 215 (after any split to a transceiver), and/or the signal line(s) between the clock signal and the tunable filter 243 may provide sufficient impedance without requiring a separate impedance element. If a separate clock signal generator is provided for any transceiver so that the clock signal of FIG. 2 is not coupled to a transceiver, an impedance (such as a resistor) may be provided in the clock signal generator generating the clock signal of FIG. 2, in the spectrum spreader 215, and/or along the signal line anywhere between the clock signal generator and the spectrum spreader 215; and/or the signal line between the clock signal generator and the spectrum spreader 215 and/or an output impedance of the clock signal generator 111 may provide sufficient impedance without requiring a separate impedance element.

Based on simulations of a core voltage of a processor of a radiotelephone with and without a spectrum spreader according to embodiments of the present invention, a reduction of about 5 dBm of interference may be provided at 936 MHz (i.e., receive channel No. 5 according to the GSM 900 MHz standard) with a clock signal of 13 MHz. More particularly, in a GSM radiotelephone including a spectrum spreader 215 as illustrated in FIG. 2 according to embodiments of the present invention, simulated noise from harmonics of a 13 MHz clock signal at 936 MHz was about −128 dBm. In the same GSM radiotelephone without the spectrum spreader, simulated noise from harmonics of a 13 MHz clock signal at 936 MHz was about −123 dBm. Moreover, the spectrum spreader 215 may consume relatively little power, may operate with little or no start-up time, and/or may be implemented with relatively few additional parts.

While the spectrum spreader 115 of FIG. 1 is discussed above as being implemented with the spectrum spreader 215 of FIG. 2 according to some embodiments of the present invention, the communications device 101 of FIG. 1 may be implemented with other spectrum spreaders according to embodiments of the present invention. Other spectrum spreaders are discussed, for example, in U.S. Patent Pub. No. 2002/0131541, U.S. Patent Pub. No. 2003/0160641, U.S. Patent Pub. No. 2005/0030114, U.S. Patent Pub. No. 2004/0257124, and U.S. Patent Pub. No. 2005/0180490, the disclosures of which are hereby incorporated herein in their entirety by reference. Still other spectrum spreaders are discussed in the specification from Alliance Semiconductor entitled "*Low Power Peak EMI Reducing Solution*" ASM3P2872A, Ref. 2.03, August 2004, the disclosure of which is hereby incorporated herein in its entirety by reference. With other spectrum spreaders, the control signal generator and/or the control signal of FIG. 1 may not be required.

In the drawings and specification, there have been disclosed embodiments of the invention and, although specific terms are employed, they are used in a generic and descriptive sense only and not for purposes of limitation, the scope of the invention being set forth in the following claims.

That which is claimed is:

1. A communications device comprising:
    a clock signal generator configured to generate a clock signal having a clock frequency;
    a receiver coupled to the clock signal generator wherein the receiver is configured to receive communications over an air interface using the clock signal;
    a spectrum spreader coupled to the clock signal generator wherein the spectrum spreader is configured to generate a spread spectrum clock signal responsive to the clock signal wherein a frequency of the spread spectrum clock signal is spread relative to the clock frequency; and
    a processor coupled to the receiver and to the spectrum spreader wherein the processor is configured to operate at the frequency of the spread spectrum clock signal and to process the communications received at the receiver.

2. A communications device according to claim 1 wherein the spectrum spreader comprises,
    a signal conductor configured to receive a clock signal having a clock signal frequency, and
    a tunable filter coupled to the signal conductor wherein the tunable filter is configured to spread a frequency of the clock signal responsive to a control signal to provide the spread spectrum clock signal.

3. A communications device according to claim 2 wherein the tunable filter comprises an inductor-capacitor (LC) band pass filter.

4. A communications device according to claim 2 wherein the tunable filter comprises an inductive circuit and a capacitive circuit coupled in parallel between the signal conductor and a reference voltage.

5. A communications device according to claim 4 wherein the capacitive circuit comprises a capacitor and a varactor diode coupled in series between the signal conductor and the reference voltage.

6. A communications device according to claim 5 further comprising:
    a control signal generator coupled to a control node between the capacitor and the varactor diode of the tunable filter wherein the control signal generator is configured to generate the control signal that is applied to the control node.

7. A communications device according to claim 6 wherein the control signal generator is further configured to generate the control signal having a control signal frequency such that the clock signal frequency is on the order of at least 10 times greater than the control signal frequency.

8. A communications device according to claim 1 wherein the receiver is configured to receive communications over the air interface using the clock signal having the clock frequency without spreading.

9. A spectrum spreader comprising:
    a signal conductor configured to receive a clock signal having a clock signal frequency; and
    a tunable filter coupled to the signal conductor wherein the tunable filter is configured to spread a frequency of the clock signal responsive to a control signal to provide a spread spectrum clock signal wherein a frequency of the spread spectrum clock signal is spread relative to the clock frequency wherein the tunable filter comprises an inductor-capacitor (LC) band pass filter.

10. A spectrum spreader comprising:
    a signal conductor configured to receive a clock signal having a clock signal frequency; and
    a tunable filter coupled to the signal conductor wherein the tunable filter is configured to spread a frequency of the clock signal responsive to a control signal to provide a spread spectrum clock signal wherein a frequency of the spread spectrum clock signal is spread relative to the clock frequency wherein the tunable filter comprises an inductive circuit and a capacitive circuit coupled in parallel between the signal conductor and a reference voltage.

11. A spectrum spreader according to claim 10 wherein the capacitive circuit comprises a capacitor and a varactor diode coupled in series between the signal conductor and the reference voltage.

12. A spectrum spreader according to claim 11 further comprising:
 a control signal generator coupled to a control node between the capacitor and the varactor diode of the tunable filter wherein the control signal generator is configured to generate the control signal that is applied to the control node.

13. A spectrum spreader according to claim 12 wherein the control signal generator is further configured to generate the control signal having a control signal frequency such that the clock signal frequency is on the order of at least 10 times greater than the control signal frequency.

14. A method of operating an electronic device, the method comprising:
 receiving a clock signal having a clock signal frequency; and
 spreading a frequency of the clock signal responsive to a control signal to provide a spread spectrum clock signal wherein a frequency of the spread spectrum clock signal is spread relative to the clock frequency;
 wherein receiving the clock signal comprises receiving the clock signal on a signal conductor and wherein spreading the frequency of the clock signal comprises filtering the clock signal using an inductor-capacitor (LC) band pass filter coupled to the signal conductor.

15. A method according to claim 14 wherein the inductor-capacitor (LC) band-pass filter comprises an inductive circuit and a capacitive circuit coupled in parallel between the signal conductor and a reference voltage.

16. A method according to claim 15 wherein the capacitive circuit comprises a capacitor and a varactor diode coupled in series between the signal conductor and the reference voltage.

17. A method according to claim 16 wherein the control signal is applied to a control node between the capacitor and the varactor diode.

18. A method according to claim 17 wherein the clock signal frequency is on the order of at least 10 times greater than a frequency of the control signal.

19. A method of operating an electronic device, the method comprising:
 receiving a clock signal having a clock signal frequency;
 spreading a frequency of the clock signal responsive to a control signal to provide a spread spectrum clock signal wherein a frequency of the spread spectrum clock signal is spread relative to the clock frequency;
 receiving communications over an air interface; and
 processing the communications received over the air interface using the spread spectrum clock signal.

20. A method according to claim 19 wherein receiving communications over the air interface comprises receiving communications over the air interface using the clock signal without spreading.

21. A method according to claim 20 wherein processing the communications received over the air interface comprises processing the communications received over the air interface using the spread spectrum clock signal having the frequency of the spread spectrum clock signal that is spread relative to the clock frequency.

* * * * *